Figure 1:
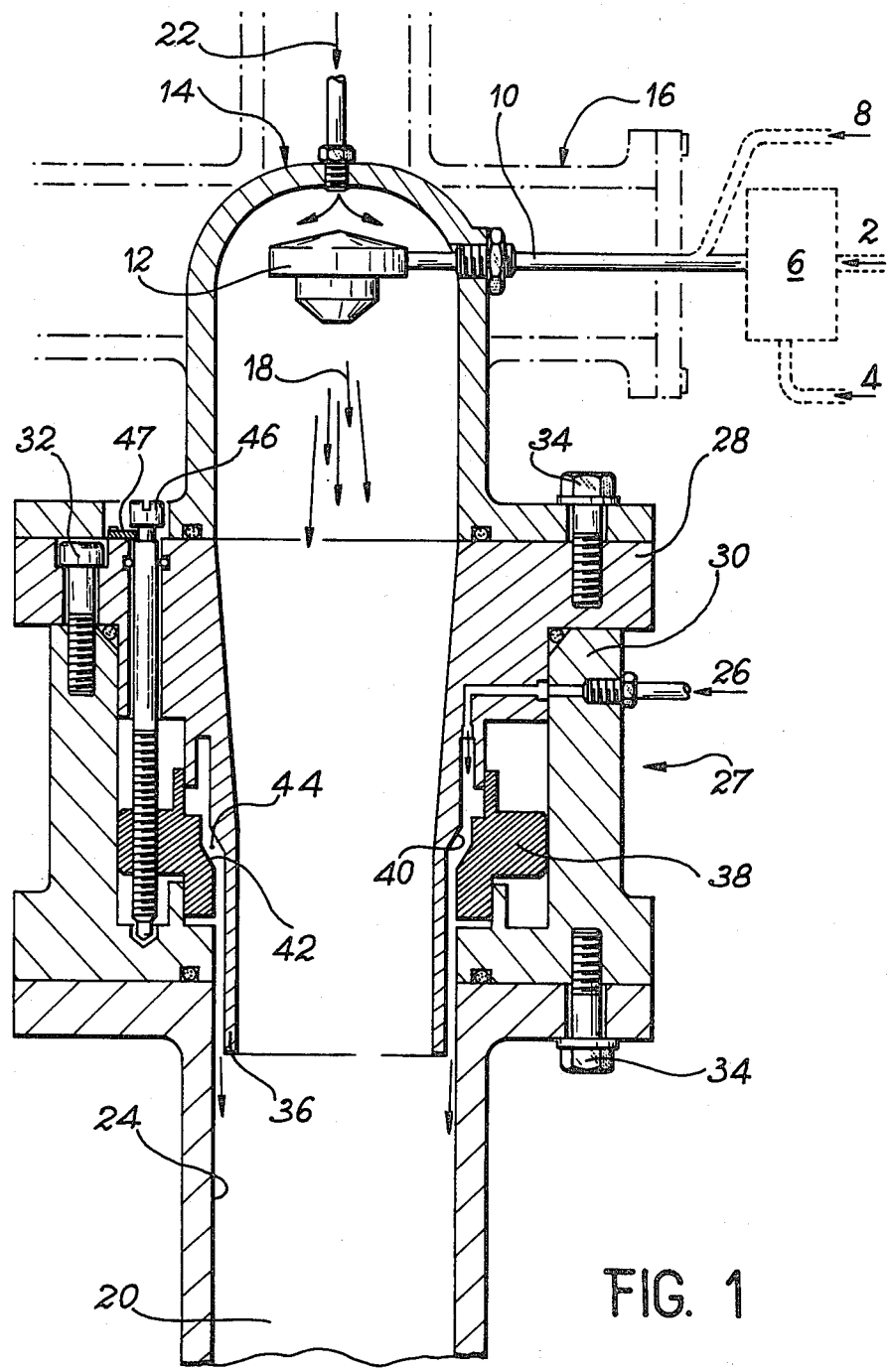

United States Patent [19]

Goumondy et al.

[11] 4,361,965

[45] Dec. 7, 1982

[54] DEVICE FOR ATOMIZING A REACTION MIXTURE

[75] Inventors: Jean P. Goumondy, Vitry sur Seine; Alain Hanssens, Bagnols sur Ceze, both of France

[73] Assignee: Commissariat a l'Energie Atomique, Paris, France

[21] Appl. No.: 221,441

[22] Filed: Dec. 30, 1980

[30] Foreign Application Priority Data

Jan. 9, 1980 [FR] France .................................. 80 00392

[51] Int. Cl.³ ............................................ F26B 17/10
[52] U.S. Cl. .................................. 34/57 R; 34/57 A; 159/4 D; 239/428
[58] Field of Search .............. 431/188, 190; 34/57 R, 34/57 A, 57 E; 159/4 R, 4 D, 4 MS; 239/427.5, 428

[56] References Cited

U.S. PATENT DOCUMENTS

| | | | |
|---|---|---|---|
| 2,269,333 | 1/1942 | Bloom | 431/188 |
| 2,436,355 | 2/1948 | Cadot et al. | 159/4 D |
| 2,460,546 | 2/1949 | Stephanoff | 34/57 R |
| 2,703,139 | 3/1955 | Rappleyea | 159/4 D |
| 3,706,599 | 12/1972 | Woodruff et al. | 159/4 D |
| 4,134,547 | 1/1979 | Gamst | 239/404 |

FOREIGN PATENT DOCUMENTS

| | | |
|---|---|---|
| 2407616 | 8/1975 | Fed. Rep. of Germany . |
| 1272073 | 4/1961 | France . |
| 2088170 | 1/1972 | France . |
| 2281777 | 3/1976 | France . |
| 2370695 | 6/1978 | France . |

*Primary Examiner*—Larry I. Schwartz

[57] ABSTRACT

The present invention relates to a device for atomizing a reaction mixture, said device enabling the reaction mixture to be atomized in a reactor with the aid of at least a first gas and an atomizing nozzle. This device further comprises a supply of a second hot gas at the top of the atomizing device, serving to dry the atomized mixture, a supply of a third gas and means for distributing this third gas comprising an annular space of adjustable width and adapted to distribute in the reactor said third gas in the form of a ring along the inner wall of the reactor, so as to avoid any contact between the reaction mixture and said wall. The invention is applicable to the atomization of a reaction mixture.

10 Claims, 4 Drawing Figures

DEVICE FOR ATOMIZING A REACTION MIXTURE

FIELD OF INVENTION

The present invention relates to a device for atomizing a reaction mixture, enabling a solid in powder form to be obtained from a jet of solution.

BACKGROUND OF INVENTION

This atomization device is used in particular for carrying out a process for the direct preparation of fissile oxides, such as uranium oxide or thorium oxide, from a solution of the corresponding nitrate. The nitrate solution, mixed with formic acid, constitutes the reaction mixture. This reaction mixture is heated until decomposition of the nitrate. This thermal decomposition leads directly to the formation of the corresponding oxide in the form of powder. To obtain more detailed information on this process of manufacture, reference may be made, for example, to French Pat. No. 2 088 170, filed on May 25, 1970 by the Commissariat à l'Energie Atomique and entitled: "Process for manufacturing fissile oxides and device for carrying out this process".

The above-described reaction mixture is injected into a reactor by means of an atomization nozzle and a hot gas, generally air. This atomized reaction mixture drops into an oven held at more or less high temperature.

When it is desired to increase the capacity of the device and therefore the rate of flow of the nitrate solution, the angle of the atomization jet on leaving the nozzle increases and the liquid, constituted by the reaction mixture, comes into contact with the wall of the oven. A solid deposit is then observed which leads to considerable fouling, particularly in the upper part of the device. This phenomenon intensifies as the rate of flow treated increases. This fouling involves frequent cleaning of the device and therefore frequent dismantling thereof. These drawbacks are a hindrance to continuous use of the device.

It is an object of the present invention to remedy these drawbacks and in particular to avoid fouling of the device, thus enabling the capacity thereof to be increased and enabling it to be used continuously.

THE INVENTION

The present invention therefore relates to a device for atomizing a reaction mixture.

This device for atomizing said mixture in a reactor with the aid of at least a first gas source and an atomizing nozzle and comprising a supply or source of a second hot gas, at the top of the atomizing device, or atomizer, serving to dry the atomized mixture, is characterised in that it further comprises a third supply or source of a third, and means for distributing this third gas comprising an annular passage of adjustable width for enabling said third gas to be distributed in the reactor in the form of a ring, along the inner wall of the recipient, so as to avoid any contact between the reaction mixture and said wall. The different gases used are preferably constituted by air.

According to a preferred embodiment of this device, the means for distributing the third gas comprise two fixed metal pieces, a top piece and a bottom piece, which are concentric with respect to each other and fast with each other and with the rest of the device, and a third concentric mobile piece which may move between the two preceding pieces so as to vary the width of the annular passage. The third piece is moved vertically and is controlled from outside the device using appropriate means.

DETAILED DESCRIPTION

The invention will be more readily understood on reading the following description with reference to the accompanying drawings, in which:

FIG. 1 shows a general diagram of the atomization device according to the invention.

FIG. 2 schematically shows a first variant embodiment of the atomization device of FIG. 1.

FIG. 3 shows a second variant embodiment of the atomization device of FIG. 1.

FIG. 4 schematically shows a device using the atomization device of FIG. 1.

Referring now to the drawings, FIG. 1 shows a device according to the invention for atomizing a reaction mixture. The solutions constituting the reaction mixture, conducted through conduits 2 and 4, are filtered by means of a filter 6 before penetrating in the atomizer. The contact time between the different solutions may be variable depending on the composition of the reaction mixture. In the particular case of a solution of plutonium nitrate and a solution of formic acid, the solutions may be injected directly into the filter 6, as shown in FIG. 1. In the case of a solution of thorium nitrate and a solution of formic acid, the solutions must be brought into contact several minutes before entering the filter 6. In this latter particular case, the reaction mixture is preheated in a pre-reactor (not shown in the drawing), to a temperature of about 60° C. A first gas, generally hot air at about 250° C., arrives in the atomizer through a conduit 8. This hot air, together with the reaction mixture, is conducted through a conduit 10 to an atomization nozzle 12.

The atomization device, or atomizer, may take different forms, and in particular a rounded form 14 or cruciform 16. The atomizer in rounded form 14 will preferably be used, so as to limit the turbulences at atomizing jet 18 level.

The reaction mixture, in liquid form, is divided in the form of a mist constituted by fine droplets, and drops into a vertical oven 20. At the top of the atomizer, a second gas such as hot air between 300° and 350° C. arrives through a conduit 22, drying the fine droplets of the reaction mixture in the form of fine particles, for example oxide. To avoid these particles depositing on the inner wall 24 of the oven 20, a third gas such as hot air at about 250° C. is conducted, according to the invention, through a passage 26 and distributed by appropriate means 27 in the form of a continuous ring along the inner wall 24 of the oven 20, passing downwardly thereon, so as dynamically to confine the atomizing jet 18.

The means 27 for distributing this third gas comprise two fixed metal pieces 28 and 30 fast with each other by means of screws such as 32. The upper piece 28 of these distribution means 27 is fast with the atomizer 14 or 16 by means of screws such as 34. Similarly, the lower piece 30 of said means is fast with the vertical oven 20 by means of screws such as 34. The upper piece 28 comprises a slender portion 36, directed downwardly and reaching below the lower piece 30. This slender portion 36 makes it possible to avoid turbulences at the outlet of the third hot gas which dynamically confines the atomizing jet 18. A third piece 38 may move vertically between the pieces 28 and 30. The upper piece 28 comprises an inclined shoulder 40 in the central part of its inner side and the third mobile piece 38 comprises on its outer side an inclined shoulder 42 identical to shoulder 40 and located thereopposite. These two shoulders define an annular passage 44 comprised between the upper fixed piece 28 and the third piece 38, of which the width may vary when said third piece moves from top to bottom. The possibility of varying the width of the passage 44 between the piece 28 and the piece 38 enables the rate of flow of the third gas arriving at 26 to be modified. The width of this passage 44 may vary from 0 to 0.5 mm. The means for vertically displacing the third piece 38 are constituted for example by at least three endless micrometric screws such as 46, passing right through the piece 28 and passing in a housing specially tapped in the piece 38. These screws 46 are maintained in place by means of tongues such as 47 screwed in the piece 28.

Figure 2:
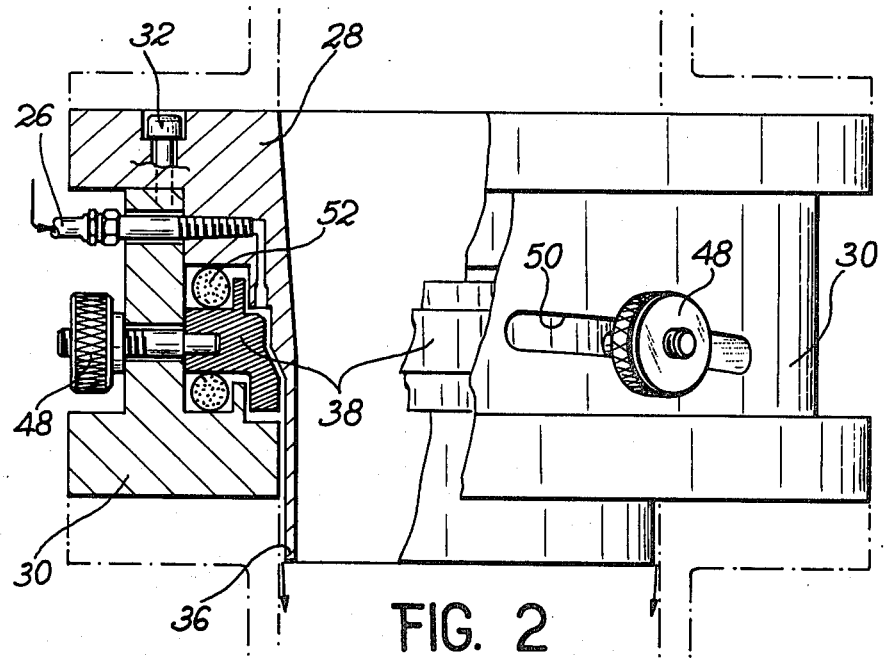

FIG. 2 shows a variant of the means for moving the third piece 38. These means are constituted by at least three hand levers such as 48 fast with the piece 38. Each of these levers 48 may move in an elongated and slightly oblique window such as 50, made in the lower piece 30 in its central part. In this variant, according to the invention, two O-rings such as 52 have been arranged between the mobile piece 38 and the fixed pieces 28 and 30; these O-rings 52 act as cushions.

Figure 3:
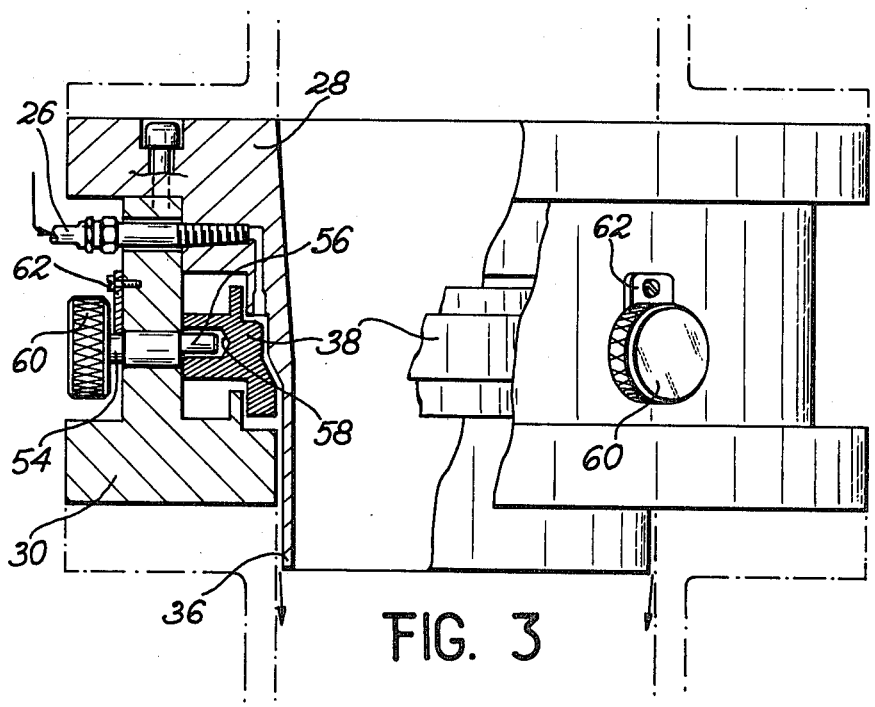

FIG. 3 schematically shows another variant according to the invention of the means for moving the third piece 38 vertically between the piece 28 and the piece 30. These means are constituted by at least three rods such as 54, comprising at one of their ends an eccentric 56 housed in a groove 58 made in the third piece 38. At the other end of the rod 54 is a piece 60, for example a knurled knob, enabling the rod 54 to be rotated manually in one direction or the other. These rods 54 pass through the lower piece 30 in its central part, and are maintained in position by means of a tongue 62 screwed in the lower piece 30.

The different means for allowing displacement of the piece 38 are equidistant from one another. In the case of three elements (rods, hand levers or micrometric screws), the angle between each of them is 120°; in the case of four elements, the angle is only 90°.

Figure 4:
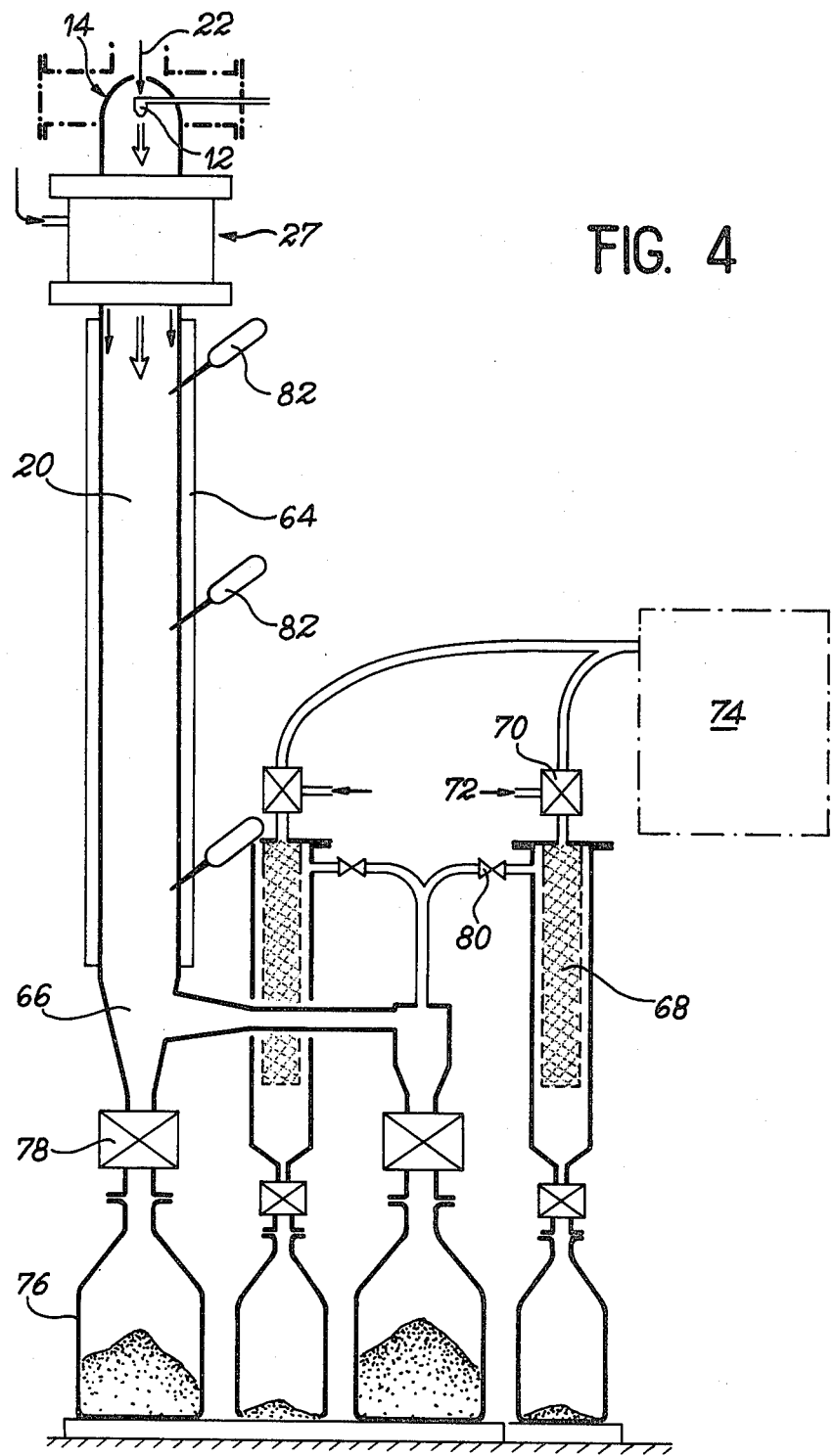

FIG. 4 schematically shows a device in which the atomizing device 14 or 16, and, according to the invention, means 27 for distributing the third gas, as described previously, are used. The reaction mixture atomized by means of the atomizing nozzle 12 is divided in the form of a mist of fine droplets which drops in a vertical oven 20 heated by heating elements such as 64 placed along the wall of the oven 20. The fine droplets of reaction mixture are dried, by means of the second hot gas arriving at 22, to form fine particules, for example oxide. At the bottom of the oven 20, these particles or grains are separated from the gases with the aid of a set of cyclones 66 followed by filters such as 68, constituted for example of sintered stainless steel of low porosity (about $3\mu$). To avoid the irreversible clogging of the filters 68, a periodic unclogging device 70 has been adapted which, by sending hot compressed air through an inlet 72 in counter-current through the filter 68, allows permanent self-cleaning. The gases filtered by means of the filter 68 are then washed with the aid of a device such as 74 before being rejected into the atmosphere. This washing device 74 comprises a water-washing column to recombine the nitrous vapours, then a purifying column using sodium hydroxide. This washing device 74, of known type, has not been shown in detail and will not be described hereinafter. The grains obtained during the chemical reaction in the oven 20 are recovered in containers such as 76 provided with valves 78. Filtering of the gases by means of filters 68 and unclogging of these filters by means of the device 70 are effected alternately on one side then the other. The valves 80 allow alternate functioning. Whilst the gases pass through one of the filters, the other is unclogged. References 82 represent temperature probes disposed equidistantly from one another along the whole of the oven 20.

The atomizing device described hereinabove presents a certain number of advantages.

Due to the dynamic confinement of the atomizing jet by means of a third gas such as a current of hot air distributed in the form of a continuous ring with the aid of means for distributing this third gas, it makes it possible to limit fouling of the top part of the oven, by avoiding direct contact of the reaction mixture with the inner wall of the oven. This further improves the heat exchange between the hot gas, generally air, and the reaction mixture, which increases the capacity of evaporation of the device.

Moreover, the use of an adjustable annular passage enables the rate of flow of the reaction mixture to be increased. In the heretofore known device, not provided with the air distribution device according to the invention, a rate of flow of reaction mixture of 15 l/hr could not be exceeded. Beyond this rate, considerable fouling was observed which required frequent cleaning of the device. With the device according to the invention, the rate of flow of the reaction mixture has been increased up to 40 l/hr., i.e. more than double the capacity of the known device. The adjustment of the rate of flow of air serving for dynamic confinement of the atomizing jet, due to the passage of variable width, depends on the rate of flow which it is desired to obtain for the reaction mixture.

The use of such a device is, of course, not limited to obtaining fissile oxides from the corresponding nitrate solution, but may generally be applied to any process for obtaining a solid in powder form from a jet of solution.

What is claimed is:

1. A device for atomizing a reaction mixture said device being a reactor having an inner wall symmetrical around an axis of revolution and including means for enabling said mixture to be atomized in said reactor with the aid of at least a first gas acting in conjunction with an atomizing nozzle, and comprising a supply of a second hot gas introduced at the top of the atomizing device, above said nozzle, serving to dry the atomized mixture said first and second gases being directed generally downwardly toward the bottom of said reactor, further comprising a supply of a third gas and means for introducing and distributing this third gas into said reactor at a point downstream of said nozzle in the direction of flow of said first and second gases comprising an annular passage of adjustable width in the form of a ring along the inner wall of the reactor for distributing said third gas in the reactor so that the flow of said third gas prevents any contact between the atomized mixture and said wall at said point and downstream therefrom.

2. The atomizing device of claim 1, wherein the each of the gases used are constituted by air.

3. The atomizing device of claim 1, wherein the means for introducing and distributing the third gas comprise two fixed metal pieces, a top piece and a bottom piece, which are concentric with respect to and overlap each other to form an annular passage therebetween and fastened to each other and to the rest of the device, and a third concentric mobile piece moveable in the annular space between the top and bottom pieces so as to vary the width of said annular passage therebetween, said top and mobile pieces including mating portions each in truncated cone shape so that said movement provides said variance in passage width.

4. The atomizing device of claim 3, wherein the third piece is moved vertically and is controlled from outside the atomizing device with the aid of appropriate means.

5. The atomizing device of claim 3, wherein the annular passage is defined by means of an inclined shoulder located on the inner side of the central part of the top piece and an inclined shoulder, identical to the first mentioned one, located on the outer side of the third mobile piece.

6. The atomizing device of claim 4, wherein the means for displacing the third piece are constituted by at least three hand levers fast with said piece, equidistant from one another, each of these hand levers being movable in an elongated, slightly oblique window made in the central part of the bottom piece.

7. The atomizing device of claim 4, wherein the means for displacing the third piece are constituted by at least three rods comprising at one of their ends an eccentric housed in a groove made in the third piece and at the other end a piece enabling the rod to be rotated manually in one direction or the other, these rods passing through the bottom piece in its central part are maintained in position by means of a tongue and are equidistant from one another.

8. The atomizing device of claim 4, wherein the means for displacing the third piece are constituted by at least three endless micrometric screws passing in a housing specially tapped in the third piece, these screws passing right through the top piece are equidistant from one another and are maintained in position by means of a tongue.

9. The atomizing device of claim 6, wherein two O-rings acting as cushions are placed between the third mobile piece and the other two fixed pieces.

10. The atomizing device of claim 3, wherein the top piece comprises a downwardly directed thin portion reaching below the bottom piece.

* * * * *